(12) United States Patent
Berghuis et al.

(10) Patent No.: US 10,349,617 B2
(45) Date of Patent: Jul. 16, 2019

(54) GRIPPER FOR ARRANGING TEAT CUPS ON AN ANIMAL FOR MILKING, ROBOT ARM AND MILKING MACHINE PROVIDED THEREWITH, AND METHOD THEREFOR

(71) Applicant: ROTEC ENGINEERING B.V., Emmeloord (NL)

(72) Inventors: Raymond Roger Berghuis, Almere (NL); Henk Hofman, Lemmer (NL)

(73) Assignee: Technologies Holdings Corp., Houston, TX (US)

( * ) Notice: Subject to any disclaimer, the term of this patent is extended or adjusted under 35 U.S.C. 154(b) by 785 days.

(21) Appl. No.: 15/100,248

(22) PCT Filed: Mar. 6, 2014

(86) PCT No.: PCT/NL2014/050135
§ 371 (c)(1),
(2) Date: May 27, 2016

(87) PCT Pub. No.: WO2014/137214
PCT Pub. Date: Sep. 12, 2014

(65) Prior Publication Data
US 2017/0000074 A1    Jan. 5, 2017

(30) Foreign Application Priority Data

Mar. 7, 2013  (NL) ...................................... 2010406

(51) Int. Cl.
*A01J 5/017*  (2006.01)

(52) U.S. Cl.
CPC .................... *A01J 5/0175* (2013.01)

(58) Field of Classification Search
CPC ................ A01J 5/017; A01J 5/0175
See application file for complete search history.

(56) References Cited

U.S. PATENT DOCUMENTS 3,412,542 A * 11/1968 Kenton .................. A01D 46/24
                                                         56/328.1
3,861,355 A *  1/1975 Johnson .................. A01J 5/017
                                                         119/14.08

(Continued)

FOREIGN PATENT DOCUMENTS

CA        2315018 A1 *  7/1999  ............ A01J 5/0175
CA        2403627 A1 *  9/2001  .............. A01J 5/017

(Continued)

OTHER PUBLICATIONS

"PCT International Preliminary Report on Patentability and Written Opinion of the International Searching Authority", International Application No. PCT/NL2014/050135, 6 pages, dated Jan. 1, 2017.

(Continued)

*Primary Examiner* — Magdalena Topolski
*Assistant Examiner* — Morgan T Barlow
(74) *Attorney, Agent, or Firm* — Baker Botts L.L.P.

(57) ABSTRACT

A gripper mounted on an arm of a milking machine includes a first clamping part extending from the arm in a longitudinal direction, and a second claiming part extending from the arm in the longitudinal direction. The second clamping part is positioned substantially parallel to the first clamping part such that the first and second clamping parts are configured to hold a first teat cup. The gripper further includes a first conveying belt running lengthwise along the first clamping part in the longitudinal direction. The gripper further includes a second conveying belt running lengthwise along the second clamping part in the longitudinal direction. The first and second conveying belts transport the first teat cup in the longitudinal direction.

12 Claims, 5 Drawing Sheets

(56) References Cited

U.S. PATENT DOCUMENTS

| | | | | |
|---|---|---|---|---|
| 3,973,520 | A | * | 8/1976 | Flocchini ............. A01J 5/017 119/14.08 |
| 3,992,861 | A | * | 11/1976 | Edwards ............. A01D 46/24 56/328.1 |
| 4,054,015 | A | * | 10/1977 | Rowell ............. B65B 5/064 414/790 |
| 5,487,461 | A | * | 1/1996 | Focke ............. B65G 47/082 198/432 |
| 6,234,300 | B1 | * | 5/2001 | De Vos ............. B07C 5/18 198/370.03 |
| 7,004,524 | B2 | * | 2/2006 | Marshall ............. B25B 9/00 294/86.4 |
| 7,051,664 | B2 | * | 5/2006 | Robichaud ............. A01D 44/00 114/312 |
| 8,967,688 | B2 | * | 3/2015 | Wilson ............. E01H 1/1206 294/1.3 |
| 9,539,729 | B2 | * | 1/2017 | Tanaka ............. B25J 15/0014 |
| 9,848,575 | B2 | * | 12/2017 | Bareket ............. A01D 44/00 114/312 |
| 10,011,020 | B2 | * | 7/2018 | Wagner ............. B25J 15/0023 |
| 10,016,902 | B2 | * | 7/2018 | Podnar ............. B65G 47/90 |
| 2003/0160470 | A1 | | 8/2003 | Marshall ............. B25B 9/00 294/86.4 |
| 2004/0065264 | A1 | * | 4/2004 | Ealy ............. A01J 5/0175 119/14.08 |
| 2004/0232716 | A1 | * | 11/2004 | Reed ............. B25J 15/00 294/86.4 |
| 2005/0076840 | A1 | * | 4/2005 | Van Den Berg ............. A01J 5/017 119/14.04 |
| 2005/0115506 | A1 | * | 6/2005 | Van Den Berg ............. A01J 5/017 119/14.03 |
| 2005/0120965 | A1 | * | 6/2005 | Van Den Berg ............. A01J 5/017 119/14.02 |
| 2005/0204991 | A1 | * | 9/2005 | Robichaud ............. A01D 44/00 114/312 |
| 2008/0050208 | A1 | * | 2/2008 | Kitazumi ............. B65G 15/10 414/173 |
| 2010/0187846 | A1 | * | 7/2010 | Crezee ............. B25J 15/0004 294/115 |
| 2011/0048329 | A1 | * | 3/2011 | Van Den Berg ............. A01J 5/007 119/14.08 |
| 2011/0114024 | A1 | * | 5/2011 | Van Den Berg ............. A01J 5/0175 119/14.02 |
| 2011/0156416 | A1 | * | 6/2011 | Kawanami ............. B25J 15/0213 294/110.1 |
| 2011/0226183 | A1 | * | 9/2011 | Hallstrom ............. A01J 5/0175 119/14.02 |
| 2011/0226184 | A1 | * | 9/2011 | Axelsson ............. A01J 5/0175 119/14.45 |
| 2011/0239945 | A1 | * | 10/2011 | Van Den Berg ............. A01J 5/08 119/14.02 |
| 2011/0268548 | A1 | * | 11/2011 | Doll ............. B25J 15/00 414/688 |
| 2012/0055408 | A1 | * | 3/2012 | Van Der Sluis ............. A01J 5/0175 119/14.08 |
| 2012/0275894 | A1 | * | 11/2012 | Hofman ............. A01J 5/0175 414/730 |
| 2013/0061807 | A1 | * | 3/2013 | Axelsson ............. A01J 5/0175 119/14.04 |
| 2013/0068166 | A1 | * | 3/2013 | Ahlem ............. A01J 7/00 119/14.02 |
| 2013/0200644 | A1 | * | 8/2013 | Shiomi ............. B25J 15/00 294/207 |
| 2013/0239897 | A1 | * | 9/2013 | Birk ............. A01J 5/0175 119/14.04 |
| 2014/0060436 | A1 | * | 3/2014 | Krone ............. B25J 15/0004 294/115 |
| 2014/0331934 | A1 | * | 11/2014 | Eriksson ............. B25J 15/00 294/86.4 |
| 2017/0086419 | A1 | * | 3/2017 | Krone ............. E01H 1/1206 294/1.3 |

FOREIGN PATENT DOCUMENTS

| | | | |
|---|---|---|---|
| CA | 2775395 | 4/2012 | |
| EP | 0360354 A1 * | 3/1990 | ............ A01J 5/0175 |
| EP | 1479290 A1 * | 11/2004 | ............ A01J 5/0175 |
| NL | 1004406 C2 * | 2/1998 | ............ A01J 5/0175 |
| WO | WO-0003585 A1 * | 1/2000 | ............ A01J 5/0175 |
| WO | WO 2000/04766 | 2/2000 | |
| WO | WO-0004766 A1 * | 2/2000 | ............ A01J 5/0175 |
| WO | 0072665 A1 | 12/2000 | |
| WO | 2005122753 A1 | 12/2005 | |
| WO | WO 2011/023620 | 3/2011 | |
| WO | 2011152790 A1 | 12/2011 | |

OTHER PUBLICATIONS

D1—D. Schillingmann, et al. "Alternativen zur Handhabung der Melkbecher", Robotereinsatz in Der Landwirtschaft, vol. 9, pp. 111-126, XP055125500, 1990.

Canadian Intellectual Property Office, Office Acton; Application No. 2,925,400; 4 pages, dated Nov. 25, 2016.

Canadian Intellectual Property Office, Official Action, Application No. 2,925,400, 4 pages, dated Sep. 30, 2016.

World Intellectual Property Organization, International Search Report issued for Int'l Patent Appl'n No. PCT/NL2014/050135, dated Jul. 7, 2014.

World Intellectual Property Organization, Written Opinion issued for Int'l Patent Appl'n No. PCT/NL2014/050135, dated Jul. 7, 2014.

D. Schillingmann et al.; "Alternativen zur Handhabung der Melkbecher;" Robotereinsatz in Der Landwirtschaft, vol. 9, 1990, pp. 111-126, XP055125500.

Canadian Intellectual Property Office, Official Action, Application No. 2,925,400, 4 pages, dated Jun. 2, 2016.

European Patent Office, Extended Search Report, Application No. 18172769.4, dated Dec. 5, 2018, 12 pages.

* cited by examiner

GRIPPER FOR ARRANGING TEAT CUPS ON AN ANIMAL FOR MILKING, ROBOT ARM AND MILKING MACHINE PROVIDED THEREWITH, AND METHOD THEREFOR

PRIORITY

This application is a U.S. National Stage Patent Application under 37 U.S.C. § 371 of International Patent Application No. PCT/NL2014/050135, filed Mar. 6, 2014, which claims the benefit and priority of Patent Application No. 2010406, filed in the Netherlands on Mar. 7, 2013, the entire contents of each of which are hereby incorporated by reference in their entirety.

The present invention relates to a gripper mountable on an arm of a milking machine for the purpose of wronging teat cups in automatic manner on teats of an udder of an animal for milking. Such animals for milking are for instance cows and goats.

Milking machines, including milking robots, are known in practice and generally make use of an arm on which a gripper is arranged. Such a gripper arranges a teat cup on a teat of an udder of an animal for milking. A teat cup is in practice taken up here by the gripper and carried from the side of the animal to the udder. The exact position of the individual teat is determined using a sensor, detector, camera or other auxiliary means, optionally in combination with identification data from the database of the milking machine relating k the animal concerned. The teat cup is then connected. Each teat cup has to be individually positioned here, so that as relatively large number of spatial movements of the gripper are required relative to the animal. This causes agitation and as lack of calmness in the animal for milking. In addition, this requires quite a period of time for positioning and placing of the teat cups at the desired locations such that the milking process as a whole operates relatively ineffectively.

The present invention has for its object to obviate or at least reduce the above stated problems with the placing of teat cups in a milking process.

The present invention provides for this purpose a gripper mountable on an arm of a milking machine for the purpose of arranging teat cups in automatic manner on teats of udder of an animal for milking, wherein the gripper comprises:

a fixation part for holding at least one teat cup; and
transport means for positioning the teat cup in the gripper relative to the fixation part.

Providing one or more, and preferably two, fixation parts enables the art least one teat cup to be held with the gripper. The teat cup is hereby displaceable relative to the animal for milking using the gripper. The teat cup can in this way be positioned using the arm, in particular the robot arm, of a milking machine. Such milking machines are for instance milking robots and a rotary milking parlour. In a currently preferred embodiment the at least one fixation part is formed by a clamping part, and preferably two clamping parts between which the teat cup is held.

Providing the gripper with transport means achieves that the teat cup can be positioned in the gripper relative to the clamping parts. This provides additional options for the positioning of the teat cup relative to the teat on which the teat cup has to be placed. This is because the gripper can be displaced as a unit, and the teat cup can in addition be displaced relative to the gripper using the transport means.

In a currently recommended preferred embodiment the transport means comprise at least one and preferably two conveyor belts extending substantially in longitudinal direction of the clamping parts. In the context of the present invention a conveyor belt is also understood to mean a band, rope and the like. Having the clamping wholly or partially performed by the conveyor belt achieves that a teat cup is displaceable in the gripper. The teat cup can hereby be positioned relative to the teat without the gripper per se having to be displaced relative to the teat.

In an advantageous preferred embodiment according to the present invention the fixation part is further provided with a magnet for bolding the at least one teat cup movably in the gripper.

Providing a magnet, for instance an electromagnet and preferably a permanent magnet, on the fixation part makes it possible to thereby hold a teat cup in the gripper. In a currently preferred embodiment the magnet is operatively connected to a conveyor belt of the fixation part such that a teat cup can be moved in effective manner relative to the fixation part of the gripper using the conveyor belt.

In an advantageous preferred embodiment according to the present invention the fixation parts are configured such that at least two teat cups can be held simultaneously.

Providing the fixation parts such that more than one, and in any case at least two teat cups can be taken up simultaneously with the gripper and carried into the vicinity of the teats of the udder of the animal far milking achieves that the teat cups can be positioned in effective manner. The teat cups are preferably removed automatically after milking. The gripper is optionally also utilized for the purpose of removing the teat cups such that removal thereof following the milking process can also be performed in effective manner. By carrying at least two teat cups in one gripper the number of movements of the gripper relative to the animal for making is greatly reduced. This increases the calmness of the animal during the milking process. This improves animal welfare.

The preparations for the milking process can also be performed more quickly, whereby the process time for milking a single animal can be reduced. The effectiveness of the whale process, and thereby the whole installation, is hereby further increased, while the time that the animal remains in or close to the milking machine is simultaneously reduced. This also further enhances animal welfare.

A second teat cup can preferably be positioned behind the first teat cup as seen in longitudinal direction of the fixation parts. The first, i.e. foremost, teat cup is positioned first by the gripper relative to the teat of an udder of an animal for milking. After the teat cup has been arranged on the teat, the second teat cup is positioned relative to the gripper using transport means. For the purpose of placing of the teat cup on the teat this will involve the second teat cup being transported forward using the transport means, preferably formed by one or two conveyor belts, such that it is carried to the correct position in longitudinal direction of the fixation parts of the gripper.

A particular advantage of being able to provide the at least two teat cups one behind the other between the fixation parts is that the gripper is movable between the hind legs of the animal for milking. This achieves that the gripper can be carried from the rear side of the animal for milking between the hind legs thereof to the teats of the udder of the animal for milking. Because the at least two teat cups are preferably provided here one behind the other, the gripper can take a relatively narrow form such that it can indeed be carried between the hind legs of the animal. It has been found that the animal hereby causes less damage to the gripper, and the arm on which it is mounted, since the calmness of the animal is hereby increased when compared to the teat cups being introduced from the side.

In a further advantageous preferred embodiment according to the present invention the gripper comprises a tilting mechanism.

Providing a tilting mechanism enables the arm of the gripper to be moved, preferably around a substantially horizontally arranged rotation shaft. The tilting mechanism is preferably configured such that a movement of the teat cup is possible in a substantially vertical plane. A high-low, i.e. a vertical, movement can hereby be made with the teat cup(s) in the gripper. Such a movement can hereby be realized in effective manner so that, when the teat cup is being connected to a teat, no contact is made with another teat of the animal for milking. The calmness of the animal is hereby further increased during the milking process.

In an advantageous preferred embodiment according to the present invention the gripper comprises a rotation mechanism.

Providing a rotation mechanism enables the arm of the gripper to be moved, preferably around a substantially vertical rotation axis. The rotation mechanism is preferably configured such that a movement of the teat cup is possible in a substantially horizontal plane. In a currently preferred embodiment the rotation mechanism is provided at or close to the outer end of the gripper so that the teat cup(s) can perform a left-right movement at the position of the teat. This achieves that it is not necessary for the whole gripper to move in a horizontal plane when a teat cup is being connected and/or removed. This increases the calmness of the animal for milking during connection and/or removal of a teat cup.

The gripper according to the invention is preferably provided with both a tilting mechanism and a rotation mechanism in order to bring about optimum calm in the animal for milking during connecting and/or removing of a teat cup. This is realized by the additionally provided reach of the teat cup(s) in the gripper according to the invention. This combination of mechanisms is especially advantageous when the milking process is performed via the hind legs of the animal for milking, wherein the gripper therefore has to be manoeuvred between the hind legs. The mechanisms are preferably driven pneumatically, although other drives such as electric or hydraulic, or combinations of drives, are also possible.

The gripper is preferably connected operatively to a detector for detecting a teat. Detector is understood to mean a range of auxiliary means used for the purpose of positioning the teat cups relative to the teats, including a camera system, preferably a 3-D camera, acoustic sensors, laser systems and so on. Such a detector is per se known from the prior art and can operate according to different principles. The positioning of the teat cup and the gripper can be performed in effective manner with such a detector. Depending on the difference between the actual position of the teat cup and the actual position of the teat, it is then possible to opt to move the gripper, to move the teat cup in the gripper wherein the gripper remains in the same position, or to opt for a combined movement of both the teat cup in the gripper and the gripper itself. Account can hereby be taken of the desired movement in a manner such that the teat cup can be placed in effective manner, and maximum calmness of the animal is preserved.

The present invention further relates to a robot arm provided with a gripper as described above and/or a milking machine provided with such a robot arm and/or gripper.

Such a robot arm and/or milking machine provide the same effects and advantages as described for the gripper. The robot arm is preferably controlled here from the milking machine. The milking machine is for instance an automatic milking robot. The gripper and/or robot arm provided therewith can otherwise also be applied on other types of milking machine.

The invention further also relates to a method for milking an animal, comprising of:
  providing a milking machine according to the invention;
  positioning the first teat cup relative to a first teat; and
  connecting the first teat cup, wherein the transport means move the first teat cup relative to the at least one fixation part.

Such a method provides the same effects and advantages as described for the gripper, robot arm and/or milking machine.

The method preferably also comprises of positioning the second teat cup in the gripper using the transport means such that the second teat cup is displaced relative to the fixation parts of the gripper, preferably using one or two conveyor belts. The second teat cup and the gripper are positioned here simultaneously or successively relative to the second teat by moving the gripper. The second teat cup is then connected to the teat. Providing two or more teat cups in the gripper makes it unnecessary to move the gripper away from the vicinity of the udder of the animal for milking, so that the number of movements of the gripper relative to the animal for milking can remain limited. This increases the calmness of the animal for milking and in addition increases the effectiveness of the milking process in that the connection of the teat cups to and optional removal thereof from the teats can be performed more easily and more quickly.

In a currently preferred embodiment the teat cup is moved some distance forward by the transport means during connection of the teat cup to the teat such that the teat cup can be arranged thereon. By being moved some distance forward the teat cup is released from the fixation parts and can be arranged on the teat using the usual technique. A small thickened portion is preferably provided here on the conveyor belt in order to arrange the teat cup from the fixation parts onto the teat in effective manner. Such a thickened portion is preferably a profile thickening or protrusion on the conveyor belt. During the connection of a teat cup to a teat, or shortly thereafter, another teat cup is preferably displaced relative to the fixation parts by the transport means. The other teat cup is preferably carried forward here relative to the fixation parts using one or two conveyor belts. The arm with gripper is preferably carried a short distance rearward here in order to thereby create more space for positioning of the gripper relative to the subsequent teat. The number of movements required for placing a subsequent teat cup is hereby reduced in effective manner. During coupling of the teat cup to the teat the gripper can perform an additional vertical movement.

Further advantages, features and details of the invention are elucidated on the basis of the preferred embodiments thereof, wherein reference is made to the accompanying drawings, in which.

Figure 1:
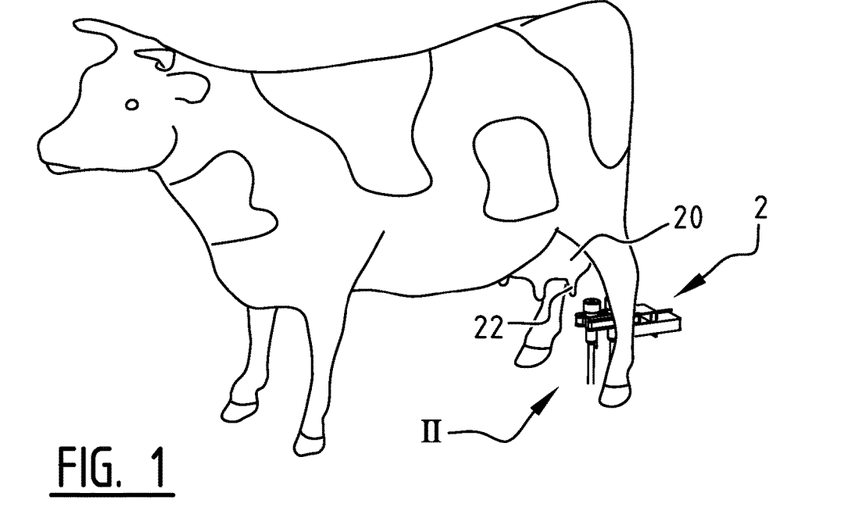
FIG. 1 shows the arranging of a teat cup with a gripper according to the invention.

In a shown embodiment (FIG. 1) a gripper 2 is carried between the hind legs of a dairy cow or other animal for milking and toward udder 20 with teats 22. Gripper 2 (FIG. 2A-E) is positioned on an arm 4. In the shown embodiment gripper 2 is configured such that first teat cup 6 and second teat cup 8 can be held simultaneously by clamping between first clamping part 10 and second clamping part 12. Clamping part 10 is also provided in the shown embodiment with a first conveyor belt 14 and second clamping part 12 is provided with a second conveyor belt 16. It is also possible to connect first and second conveyor belts 14, 16 to form a combined conveyor belt, whereby driving thereof is simplified. Teat cups 6, 8 are provided on the underside with milk hose 18. Teat cups 6, 8 are positioned relative to udder 20 and arranged on one of the teats 22.

Figure 2A:
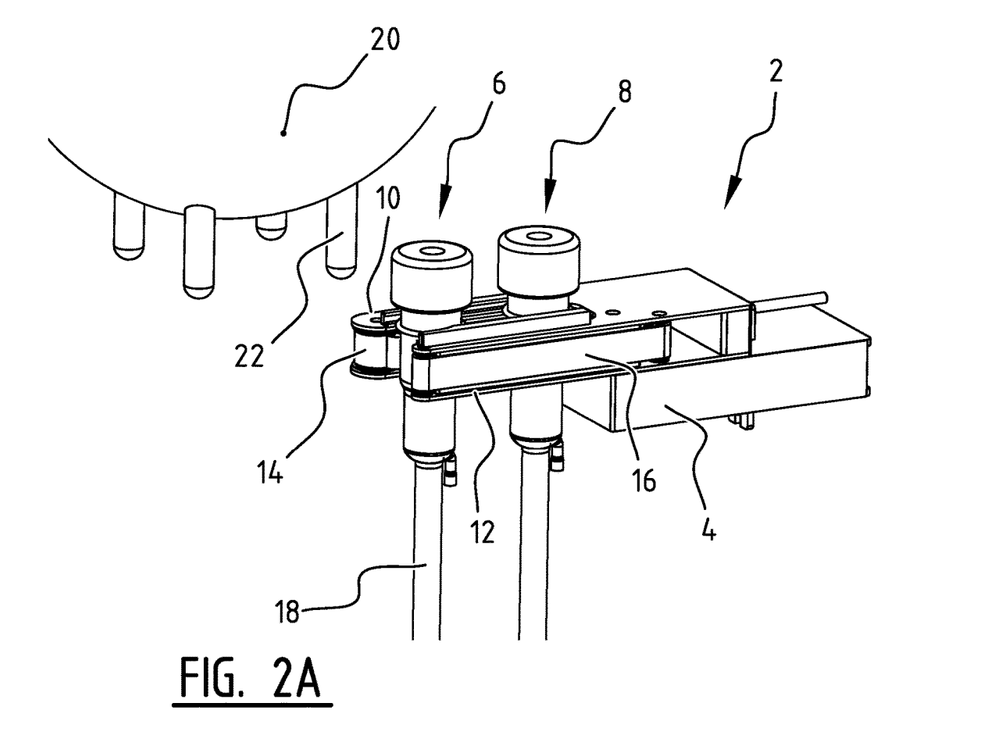
FIG. 2A-E show details of the arranging of FIG. 1.
Figure 2B:
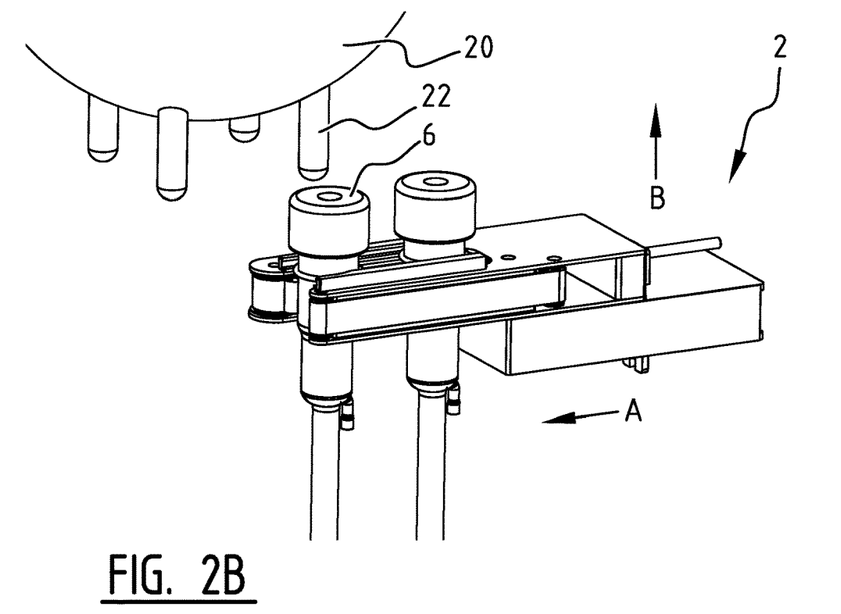
Figure 2C:
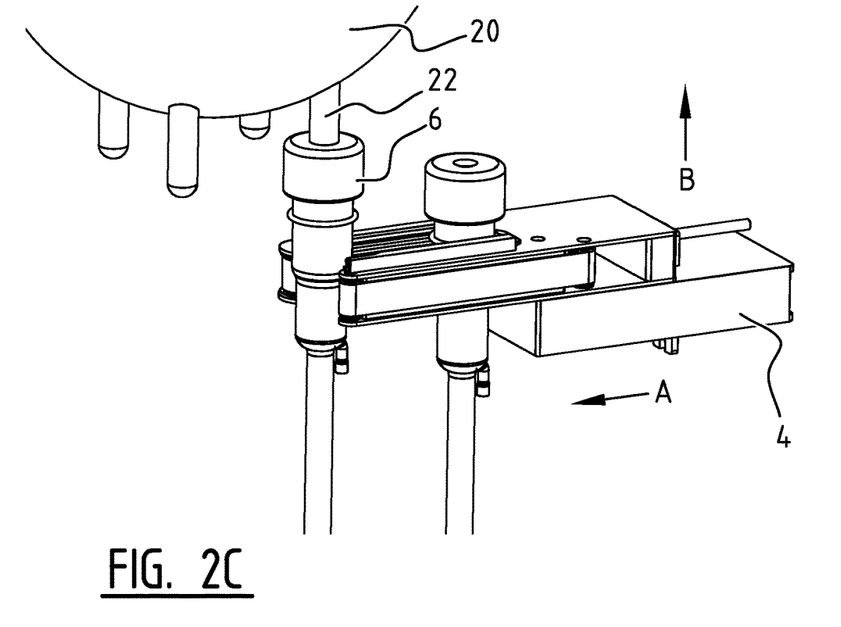
Figure 2D:
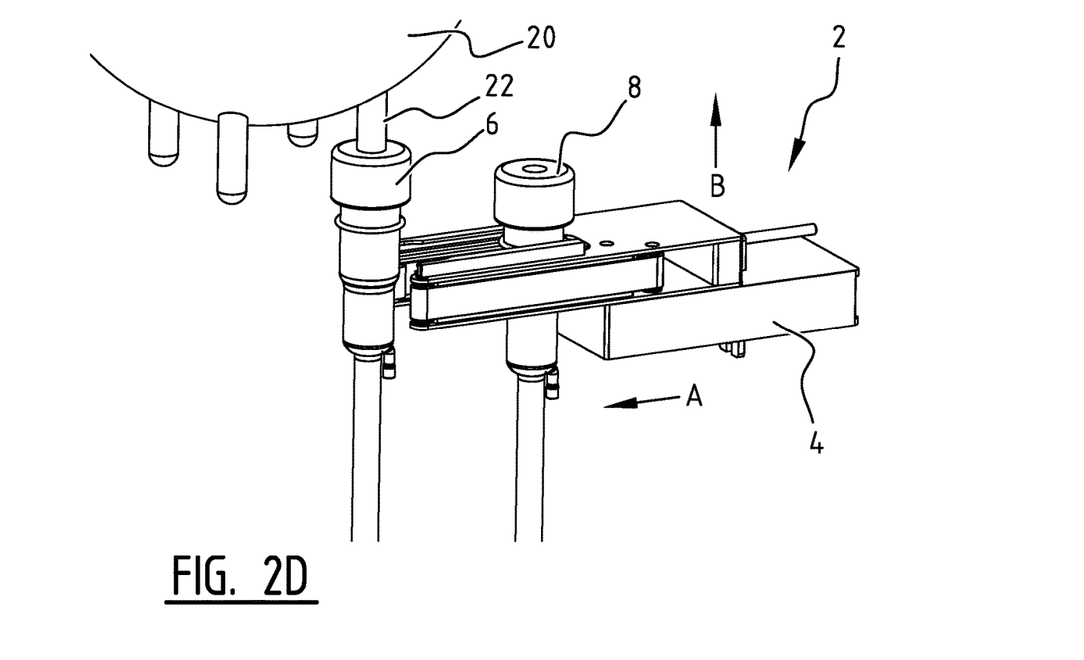
Figure 2E:
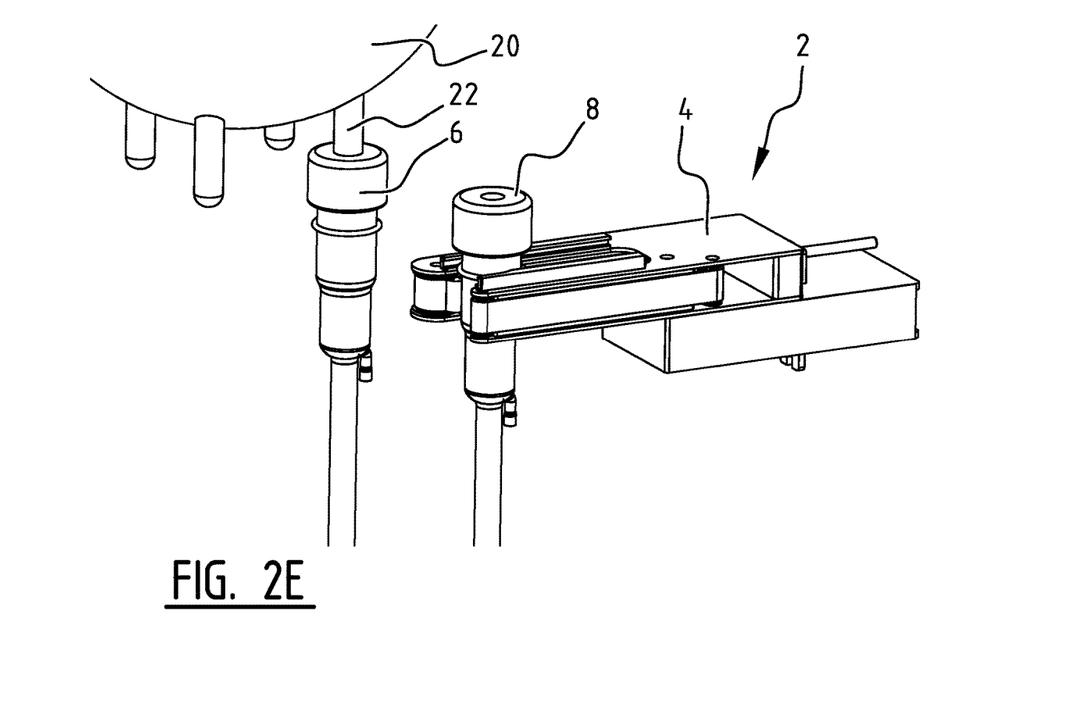

During placing of a teat cup 6, 8 on a teat 22 of udder 20 the arm 4 with gripper 2 is first moved toward udder 20. The gripper is preferably positioned here between the hind legs of the animal for milking. Use is preferably made of a sensor or detector (not shown) during this positioning. As soon as the gripper with teat cups 6, 8 has moved into the vicinity of teat 22 (FIG. 2A) the arranging of teat cup 6, 8 on teat 22 begins. Once teat 22 of udder 20 of the animal for milking has been identified by for instance a camera on robot arm 4, and the associated position has been transmitted, arm 4 is guided here with front teat cup 6 under teat 22. In the shown embodiment conveyor belts 14, 16 will transport teat cups 6, 8 a number of millimeters forward in the direction A (FIG. 2B). The foremost teat cup 6 is released to some extent here from the clamping between first clamping part 10 and second clamping part 12.

In the shown embodiment arm 4 moves simultaneously, or at least substantially simultaneously, upward to some extent in direction B (FIG. 2C) so that teat cup 6 can be connected to teat 22 by means of vacuum. Teat cup 6 then slides upward in direction B in conventional manner so as to connect to teat 22. Conveyor belt 14, 16 preferably continues to run on a little so that teat cup 6 is wholly released from clamping parts 10, 12. Arm 4 is here preferably moved rearward to some extent (FIG. 2D) in a direction opposite to direction A so as to create space for gripper 2. Conveyor belts 14, 16 then continue to run (FIG. 2E), whereby second teat cup 8 is carried forward in direction A relative to clamping parts 10, 12 such that it can be connected to a subsequent teat 22 of udder 20 of the animal for milking.

In the shown embodiment the width of gripper 2 is about twice the width of teat cup 6, 8, i.e. about twice 10 cm. This achieves that gripper 2 is particularly suitable for positioning between the hind legs of the animal for milking so that from such a position it can connect teat cups 6, 8 to teats 22 of udder 20 of the animal for milking.

Figure 3:
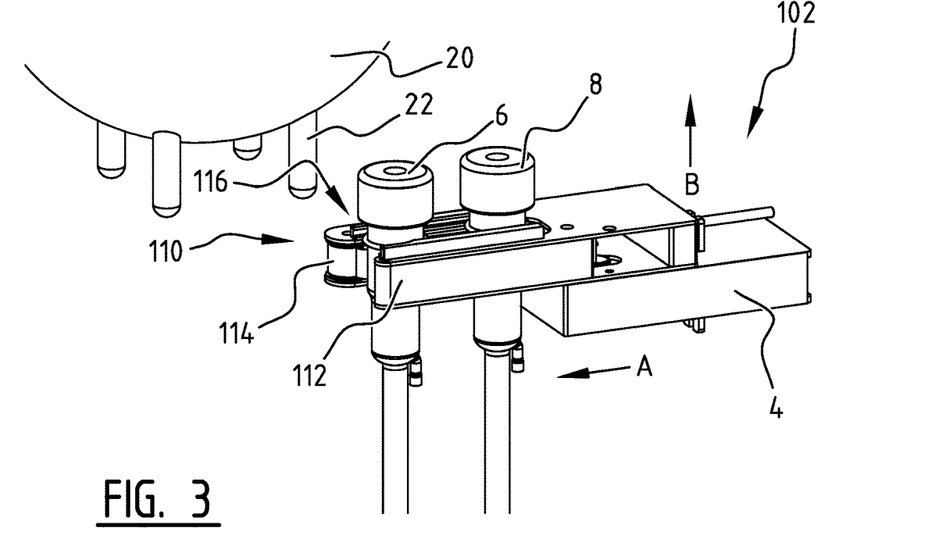
FIG. 3 shows an alternative embodiment of a gripper according to the invention.

In an alternative embodiment a gripper 102 (FIG. 3) is embodied with a first fixation part 110 provided with a conveyor belt 114. In this alternative embodiment a second fixation part/guide 112 is provided without conveyor belt and functions as guide. Belt 114 is provided in the shown embodiment with a magnet 116, for instance a permanent magnet, for the purpose of holding teat cup 6, such that it can be transported further relative to first fixation part 110. Guide 112 can optionally be dispensed with. Teat cup 6, 8 can optionally be further provided with a sleeve (not shown) at the position of the contact with conveyor belt 114 in order to avoid twisting of teat cup 6, 8 during forward movement in gripper 102. In the shown embodiment the other components are substantially the same as in gripper 2 shown in FIG. 2.

Alternative gripper 102 (FIG. 4A-B) comprises arm 104 provided on the side with side plate 106. Provided on the free outer end of arm 104 are first side arm 108 and second side arm 110. First side arm 108 is provided in the shown embodiment with flat conveyor belt 112. Second side arm 110 is provided in the shown embodiment with a profiled conveyor belt 114. The profiles on belt 114 are shaped such that a number of teat cups 6, 8 can be held between two adjacent profiles in the form of for instance ridges or thickened portions.

Figure 4A:
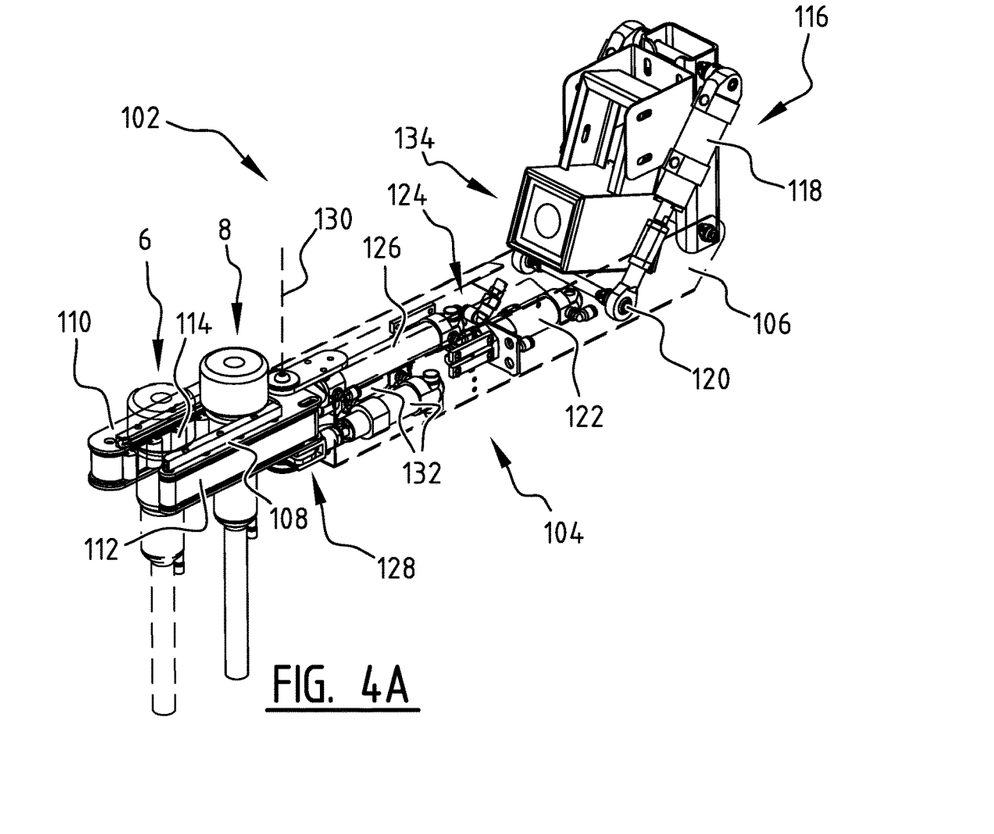
FIG. 4A-B show a further alternative embodiment of a gripper according to the invention.
Figure 4B:
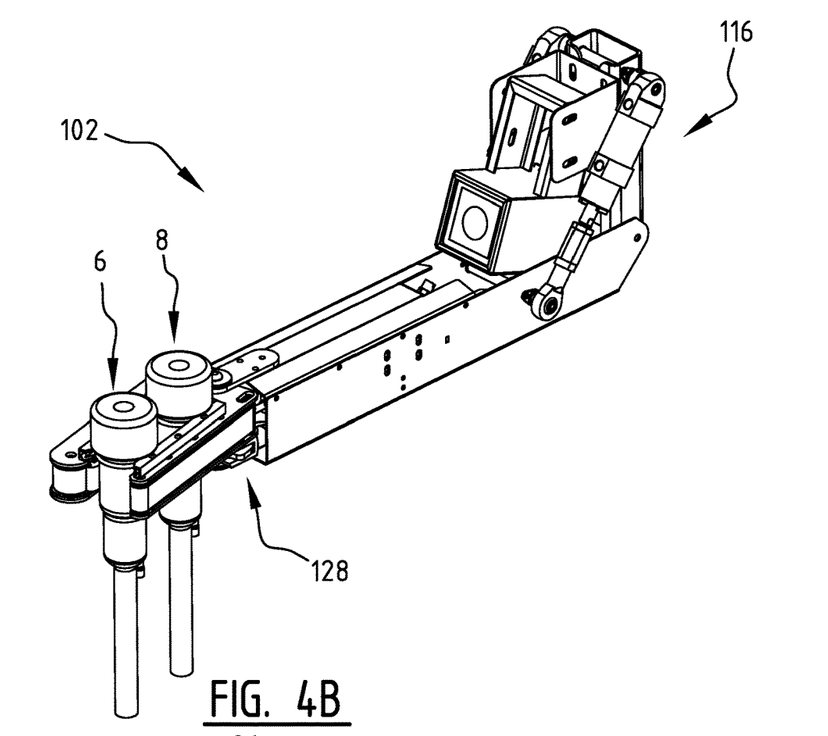

Gripper 102 is provided with tilting mechanism 116 comprising lifting cylinder 118 and rotation shaft 120. Tilting mechanism 116 enables a movement of cups 6, 8 substantially in the vertical plane.

First small cylinder 122 with a stroke of for instance 20-30 mm is operatively connected using connecting mechanism 124 to second large cylinder 126 with a stroke of for instance 80-100 mm. In the shown embodiment second cylinder 126 provides for the displacement of teat cup 8 from a rearmost position to a foremost connecting position. In the shown embodiment teat cup 6 is moved further through a short distance during arranging thereof on a teat in order to simplify the placing of cup 6. Small cylinder 122 provides for this small movement.

Rotation mechanism 128 with rotation axis 130 is provided at the free outer end of arm 104. Rotation mechanism 128 enables a left-right movement of side arms 108, 110 in a substantially horizontal plane. Cups 6, 8 can hereby be manoeuvred to the desired arranging position, or during removal. This makes it possible to position cups 6, 8 without movement of arm 104 between for instance the hind legs of the animal for milking. The left-right movement of side arms 108, 110 around rotation axis 130 is possible in the shown embodiment by controlling two cylinders 132.

In the shown embodiment gripper 102 is provided with 3-D camera 134. Camera 134 enables a precise positioning of cups 6, 8. Camera 134 is connected for this purpose to a controller with which the movement(s) arm 104 are controlled. Camera 134 is provided at a distance from side arms 108, 110 such that gripper 102 can be positioned between the hind legs of the animal for milking.

In addition to applying gripper 2, 102 in a fixed cubicle application, gripper 2, 102 can also be applied in a rotary milking parlour. Such a rotary milking parlour 24 (FIG. 5) can be provided as a type of inner milking apparatus or a type of outer milking apparatus and can be provided with gripper 2, 102. This relates to the positioning oldie animal for milking relative to the rotary milking parlour. In rotary milking parlour 24 the animal for milking is first moved into one of the cubicles 26 of rotary milking parlour 24 at entrance 26. Following pretreatment 28 teat cups 6, 8 are then arranged in the above described manner on teats 22 of udder 20 of the animal for milking at connecting position 30. After teat cups 6, 8 have been arranged, the milking begins through rotation part 32, wherein rotary milking parlour 24 rotates in direction C or in the opposite direction. After the milking process has ended, the placed teat cups 6, 8 are removed with a removal system from teats 22 of udder 20 of the milked animal during after-treatment 34. The milked animal then steps out of rotary milking parlour 24 at exit 36, after which cubicle 26 is made ready to receive a subsequent animal for milking.

Figure 5:
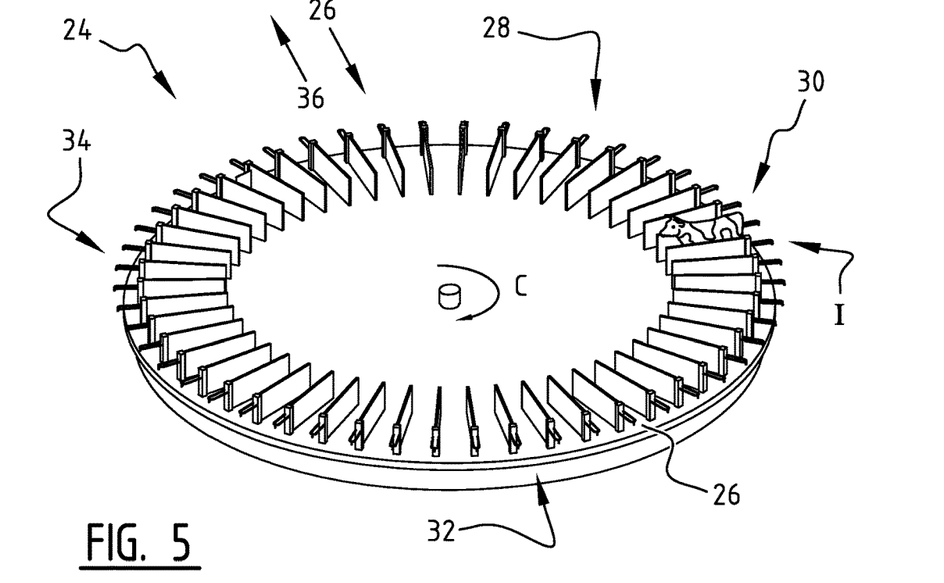
FIG. 5 shows a schematic overview of a rotary milking parlour provided with the gripper of FIGS. 1-4.

A rotation of rotary milking parlour 24 usually takes about seven to eight minutes, during which a milk yield of about 25-30 liters can be realized in the case of for instance a dairy cow. Reducing the time required for the cleaning, connection and removal of teat cups 6, 8 makes more time available for the actual milking process. It has been found that with a rotary milking parlour 24 provided with grippers 2 according to the invention about seven minutes in this way remain for the actual milking process. The yield is hereby maximized and the calmness of the animal for milking is also increased.

The present invention is by no means limited to the above described embodiments thereof. The rights sought are defined by the following claims, within the scope of which many modifications can be envisaged. It is thus possible for instance, instead of having two teat cups 6, 8 in a gripper 2, to realize a somewhat extended gripper 2 in which four teat cups 6, 8 can for instance be arranged.

The invention claimed is:

1. A gripper mounted on an arm of a milking machine, the gripper comprising:
    a first clamping part extending from the arm in a longitudinal direction, wherein the first clamping part has a proximal end coupled to the arm and a distal end;
    a second clamping part extending from the arm in the longitudinal direction and positioned side-by-side to the first clamping part such that the first and second clamping parts are configured to hold a first teat cup, wherein the second clamping part has a proximal end coupled to the arm and a distal end;
    a first conveying belt running lengthwise along the first clamping part in the longitudinal direction,
    a second conveying belt running lengthwise along the second clamping part in the longitudinal direction, at least one of the first and second conveying belts comprising at least one profiled shape formed in the surface of the respective conveying belt, such that a respective teat cup is held within each profiled shape and the first and second conveying belts are operable to transport the first teat cup in the longitudinal direction.

2. The gripper of claim 1, wherein the first and second conveying belts are configured to transport the first teat cup in a direction away from the proximal ends of the first and second clamping parts and toward the distal ends of the first and second clamping parts.

3. The gripper of claim 1, wherein the first and second conveying belts are configured to transport the first teat cup in a direction toward the proximal ends of the first and second clamping parts and away from the distal ends of the first and second clamping parts.

4. The gripper of claim 1, further comprising a magnet for holding the first teat cup movably in the gripper.

5. The gripper of claim 1, wherein the first and second clamping parts are further configured to hold a second teat cup simultaneously with the first teat cup.

6. The gripper of claim 5, wherein the second teat cup is positioned adjacent to the first teat cup along the longitudinal direction.

7. The gripper of claim 1, further comprising a tilting mechanism.

8. The gripper of claim 7, wherein the tilting mechanism is configured to move the first teat cup in a vertical plane.

9. The gripper of claim 1, further comprising a rotation mechanism.

10. The gripper of claim 9, wherein the rotation mechanism is configured to move the first teat cup in a horizontal plane.

11. The gripper of claim 1, wherein the gripper is movable between the hind legs of an animal for milking.

12. The gripper of claim 1, wherein the gripper is connected operatively to a detector for detecting a teat.

* * * * *